United States Patent [19]
Watanabe

[11] Patent Number: 5,187,622
[45] Date of Patent: Feb. 16, 1993

[54] MAGNETIC DISK DRIVE APPARATUS HAVING A PROTECTION MECHANISM FOR PROTECTING A MAGNETIC HEAD FROM COLLISION WITH A MAGNETIC DISK WHEN LOADING OR UNLOADING THE MAGNETIC DISK

[75] Inventor: Takashi Watanabe, Ichikawa, Japan

[73] Assignee: Teac Corporation, Japan

[21] Appl. No.: 638,041

[22] Filed: Jan. 4, 1991

[30] Foreign Application Priority Data

Aug. 20, 1990 [JP] Japan .................................. 2-218490
Sep. 21, 1990 [JP] Japan .................................. 2-253860
Oct. 30, 1990 [JP] Japan .................................. 2-293444

[51] Int. Cl.$^5$ .......................... G11B 17/028; G11B 5/40
[52] U.S. Cl. .................................. 360/99.02; 360/128
[58] Field of Search .............. 360/99.02, 99.03, 99.06, 360/99.07, 128

[56] References Cited

U.S. PATENT DOCUMENTS 4,709,286 11/1987 Koike ................................ 360/99.02
4,794,481 12/1988 Suyama et al. .................... 360/99.06
4,802,041 1/1989 Uehara ............................. 360/99.06

FOREIGN PATENT DOCUMENTS 52-141313 3/1977 Japan .

Primary Examiner—Robert S. Tupper
Attorney, Agent, or Firm—Andrus, Sceales, Starke & Sawall

[57] ABSTRACT

A cartridge type disk apparatus for recording and/or reproducing an information signal, by means of a recording head, on and from an information recording disk that is accommodated in a cartridge and mounted on the cartridge type disk apparatus together with the cartridge such that the information recording disk is located with a predetermined relationship with respect to the recording head. The apparatus comprises a chassis base, a disk cartridge support member disposed on the chassis base in the vicinity of the recording head for supporting the disk cartridge, and a mechanism for displacing the disk cartridge support member such that when the disk cartridge is inserted, the disk cartridge support member protrudes beyond the head to a support position wherein the disk cartridge support member supports the disk cartridge, and when the disk cartridge is mounted with a displacement in a direction perpendicular to a major surface of the disk cartridge, the disk cartridge support member displaces to a retreat position where it does not obstruct mounting of the disk cartridge.

4 Claims, 13 Drawing Sheets

MAGNETIC DISK DRIVE APPARATUS HAVING A PROTECTION MECHANISM FOR PROTECTING A MAGNETIC HEAD FROM COLLISION WITH A MAGNETIC DISK WHEN LOADING OR UNLOADING THE MAGNETIC DISK

BACKGROUND OF THE INVENTION

The present invention relates to a cartridge type disk apparatus.

In recent years, there has been the tendency for portable word processors and computers to become more compact (and thinner in particular).

Accompanying this, there has been a demand for even thinner magnetic disk apparatus of the cartridge type which can be incorporated into this apparatus.

FIG. 1, FIG. 2 and FIG. 3 show cartridge type magnetic disk apparatus which are examples of the conventional art.

FIG. 1 shows the status before the magnetic disk cartridge is inserted, and FIG. 2 shows the status where the magnetic disk cartridge is inserted. FIG. 3 is a sectional perspective view taken along the section lines III—III of FIG. 1(A).

Element 12 is a front fascia. Element 13 is a magnetic head carriage, and comprises a lower side magnetic head 14, a head arm 15, an upper side magnetic head 16, and the like.

Element 17 is a motor and Element 18 is a turntable. 19 is a circuit board assembly and is mounted to the bottom surface side of an apparatus 10.

The cartridge holder 20 has support grooves 20a, 20b on both sides, as shown in FIG. 3 and FIG. 11, and the lower side is an opening 20c.

Moreover, the reason why the card holder 20 has an opening 20c on its lower surface is because the magnetic disk apparatus 10 can be made thinner by increasing the degree of freedom for the placement of the circuit board and other mechanisms.

In FIG. 1, 21 is a cartridge insertion opening and is positioned at a height H1.

The height dimension of a magnetic disk apparatus 10 is h1.

Element 30 is a disk cartridge that houses the magnetic disk 31.

In the status shown in FIG. 1 for the apparatus 10, the cartridge 30 passes through the insertion hole 21 in the horizontal position, and is inserted in the direction of the arrow X1 and furthermore, is inserted so that both side are supported by the support grooves 20a, 20b of the cartridge holder 20.

The leading edge 30a of the cartridge 30 in the direction of insertion passes the magnetic head 14,16 and is inserted to the final position P1 indicated by the double dotted line in FIG. 1. When it is, the cartridge holder 20 is lowered in the direction Z1 that is perpendicular to the direction X1 described above, and sinks so that the cartridge 30 is mounted in the status shown in FIG. 2.

More specifically, the hub at the center of the magnetic disk 31 is mounted on the turntable 18, and the magnetic heads 14,16 are in moving contact with the shutter (indicated by 30c in FIG. 4) and pass through an open opening window (not indicated in the figure) to enter the cartridge and come into contact with the upper surface and the lower surface of the magnetic disk 31.

The magnetic disk 31 is rotated in this status, and the carriage 13 is displaced and the recording and reproduction of information performed. When the cartridge 30 is inserted inside the cartridge holder 20, damage to the magnetic head 14 is caused if the leading edge for insertion of the cartridge 30 contacts the magnetic head 14. Accordingly, it is necessary for the apparatus 10 to be configured so that the cartridge 30 does not strike the magnetic head 14.

Sometimes the disk cartridge is a warped disk cartridge 30A as shown by the double-dotted line in FIG. 3.

When such a disk cartridge 30A is inserted, there is a greater likelihood that it will strike the magnetic head 14. Even in such cases, the cartridge holder 20 has the surface 20d supporting the cartridge, disposed at a dimension al higher than the head surface 14a of the magnetic head 14. This dimension is in the range of several millimeters for the sake of safety. Because of this, the dimension from the bottom surface of the apparatus 10 with the height H1 for the cartridge insertion opening 21 becomes higher by the dimension b1 and the height dimension h1 of the apparatus 10 becomes larger so that there are problems involved in making the apparatus 10 thinner.

SUMMARY OF THE INVENTION

An object of the present invention is to provide a cartridge type magnetic disk apparatus in which the problems described above are eliminated. Another object of the present invention is to provide a cartridge type magnetic disk apparatus having a configuration comprising a disk cartridge support member disposed in the vicinity of a lower side magnetic head, and that comes to a position where an inserted disk cartridge deforms in the upwards direction and protrudes from a lower side magnetic head.

According to the present invention, it is possible to set the cartridge insertion opening to a height lower than the conventional height, and for magnetic disks to be prevented from striking the magnetic heads when a warped disk cartridge is inserted, and of course when unwarped disk cartridges are inserted. By this, it is possible to make the cartridge type disk apparatus thinner and at the same time ensure that there will be no damage to the magnetic head.

DETAILED DESCRIPTION OF THE INVENTION

Figure 1:
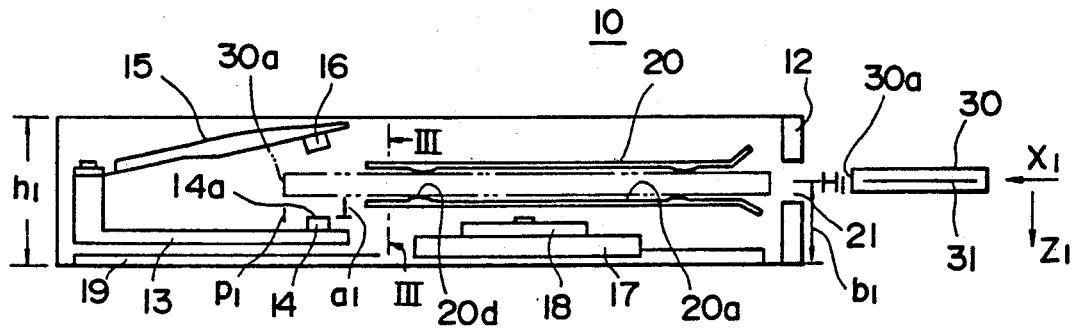
FIG. 1 is a side view indicating the status before a disk cartridge is inserted in to a conventional disk cartridge type of magnetic disk apparatus.
Figure 2:
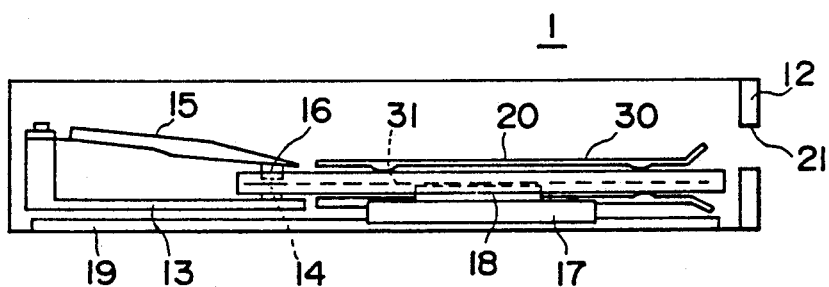
FIG. 2 is a side view indicating the status where the disk cartridge is inserted.
Figure 3:
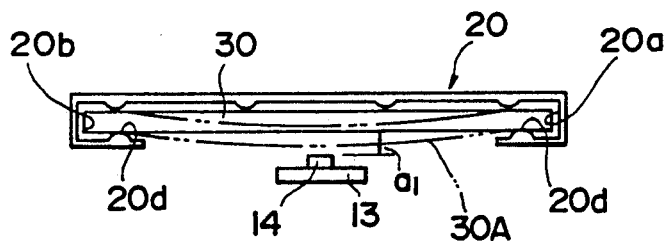
FIG. 3 is a sectional view along the section lines III—III of FIG. 1.

FIG. 4 through FIG. 8 show a magnetic disk apparatus 40 of a first embodiment according to the present invention. In the figures, portions that are the same as corresponding portions in FIG. 1 through FIG. 3 are indicated with the same numerals, and the corresponding descriptions of them are omitted.

Figure 5:
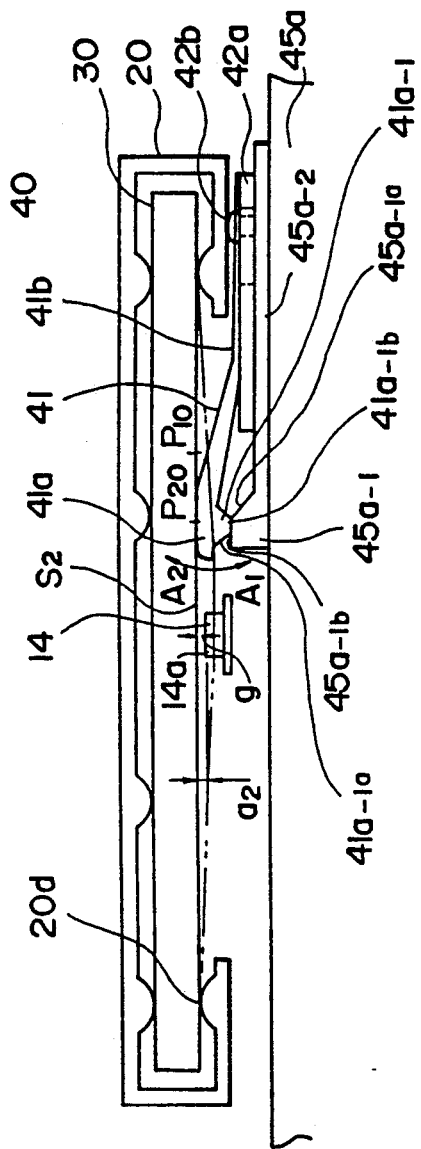
FIG. 5 is a view showing the status prior to the inserting of the disk cartridge, seen from the direction of the arrow X1 of FIG. 4.
Figure 6:
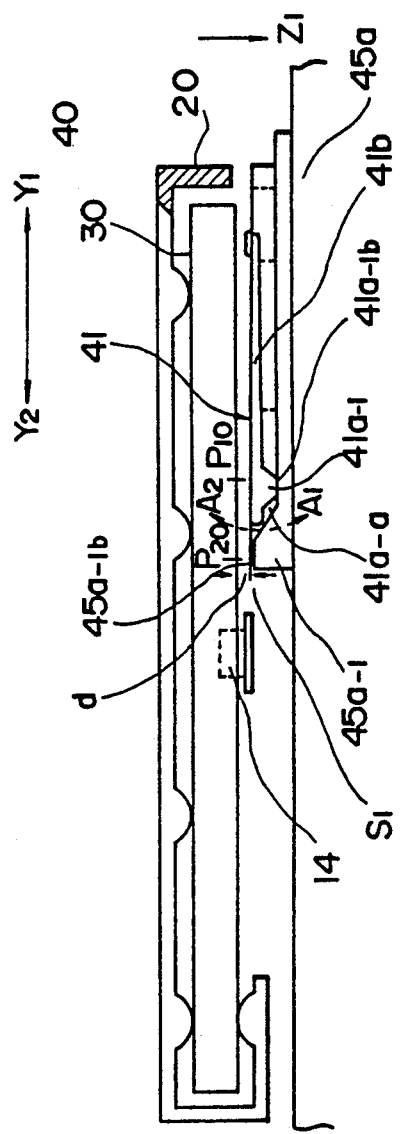
FIG. 6 is a view showing the status after the inserting of the disk cartridge, seen from the direction of the arrow X1 of FIG. 4.
Figure 7:
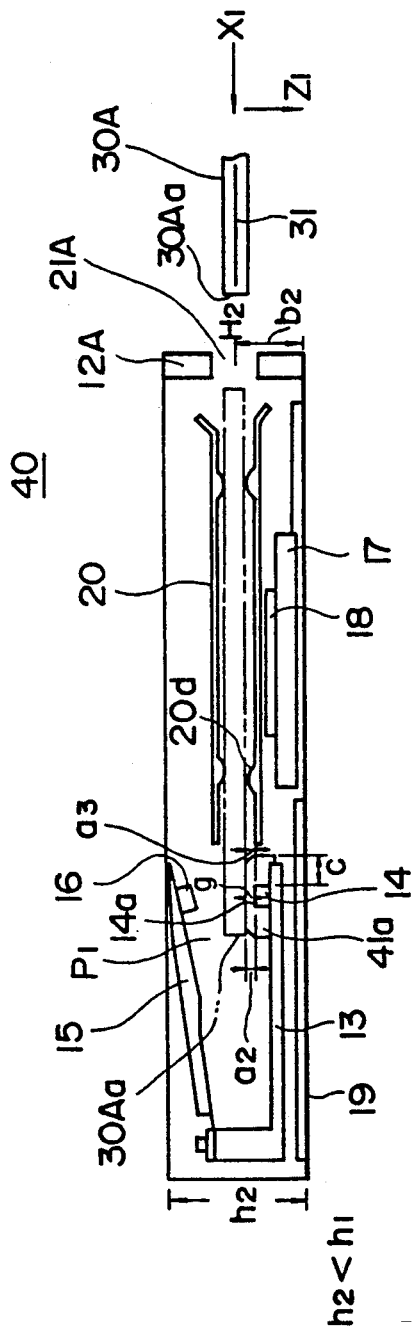
FIG. 7 is a view showing the status prior to the inserting of the disk cartridge, seen from the direction of the arrow Y1 of FIG. 4.
Figure 8:
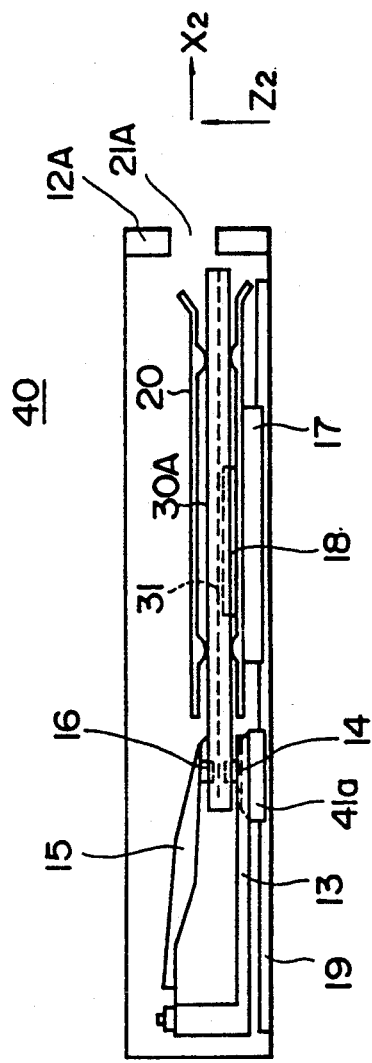
FIG. 8 is a view showing the status after the mounting of the disk cartridge, seen from the direction of the arrow Y1 of FIG. 4.

FIG. 5 and FIG. 7 show the status prior to the insertion of the cartridge, and FIG. 6 and FIG. 8 show the status where the cartridge is inserted.

Figure 4:
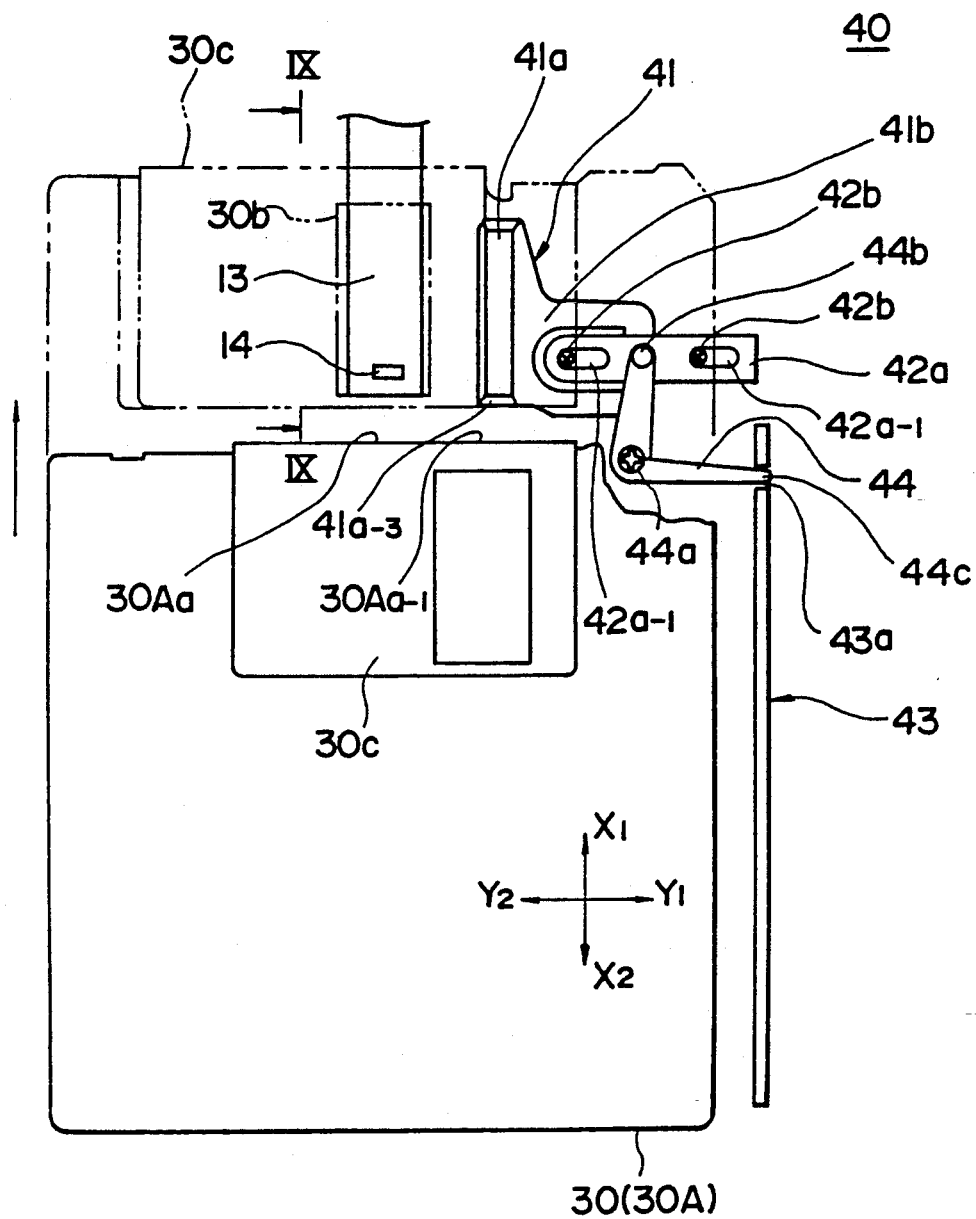
FIG. 4 is a plan view of the magnetic disk apparatus of a first embodiment according to the present invention.

In FIG. 4 and FIG. 6, 41 is a disk cartridge support member and comprises the disk cartridge support portion 41a (hereinafter termed support portion 41a) provided along the length of the direction of insertion and removal of the disk cartridge 30 as shown by the arrows X1-X2 in FIG. 4, and an arm portion 41b that extends to one side from it.

This disk cartridge support member 41 has a support portion 41a of the arm portion 41b and an end portion on the opposite side fixed to a slide portion 42a. This slide portion 42a is freely movable with respect to an apparatus main unit 45 by the engagement of two slide grooves 42a-1 of a slide member 42a, with two fixed screws 42b fixed to an apparatus main unit 45 (refer to FIG. 10) of a magnetic disk apparatus 40. The fixed screws 42b are provided in a row in the vertical direction (indicated by the arrows Y1-Y2 in the diagram) with respect to the direction of insertion and removal of the cartridge holder 20 and accordingly, the disk cartridge support member 41 is also in moving contact in the direction (indicated by the arrows Y1-Y2 in the diagram) with respect to the direction of insertion and removal of the cartridge holder 20.

The arm portions 41b are formed by a plate-shaped member having flexibility, and by this, the support portion 41a is rotatable in the direction indicated by the arrows A1-A2 in FIG. 5, and is provided so as to be urged in the direction of A1.

As shown in FIG. 4, the central portion of the slide member 42a has pivotably mounted in it one of the end portions of an L-shaped member 44 and the angle portion of this L-shaped member 44 are pivotably mounted in the apparatus main unit 45 by fixed screws 44a so as to be freely rotatable. In addition, the other end portion of the L-shaped member 44 engages with a cutout 43a of a slide plate 43 for raising and lowering the disk cartridge. Accordingly, the motion of the support portion 41a in the direction Y1-Y2 is performed by transfer of the rotation motion of the L-shaped member 44 to the slide member 42a.

Figure 13:
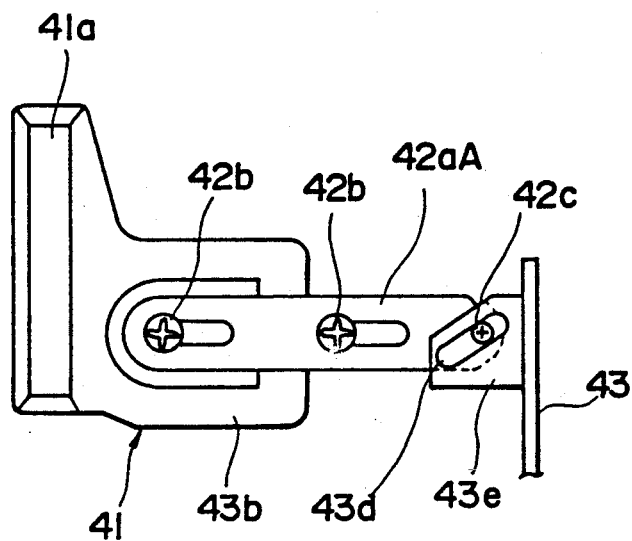
FIG. 13 is a view showing another embodiment of a link mechanism.

Here, the mechanism that transfers the operation of the slide plate 43 to the slide member 42a is not limited to the embodiment described above, as for example, the same operation can be obtained by providing fixing screws 42c to the trailing end portion of the slide member 42a as shown in FIG. 13, in a configuration provided with a guide plate 43e with guide groove 43d provided at an angle and engaging with the fixing screws 42c.

The rear surface of the support portion 41a shown in FIG. 5 is formed with protruding portions 41a-1 in the downwards direction. Of these protruding portions 41a-1, the side surface opposing the lower side magnetic head 14 is the inclined surface 41a-1a. In addition, the lower end which is the distal end of the protruding portions 41a-1 is a flat surface 41a-1b. The support portion 41a is at a position on the right hand side of the lower side magnetic head 15 when seen from the direction of insertion of the cartridge, and is disposed at a position in the vicinity of the magnetic head 14.

Figure 9:
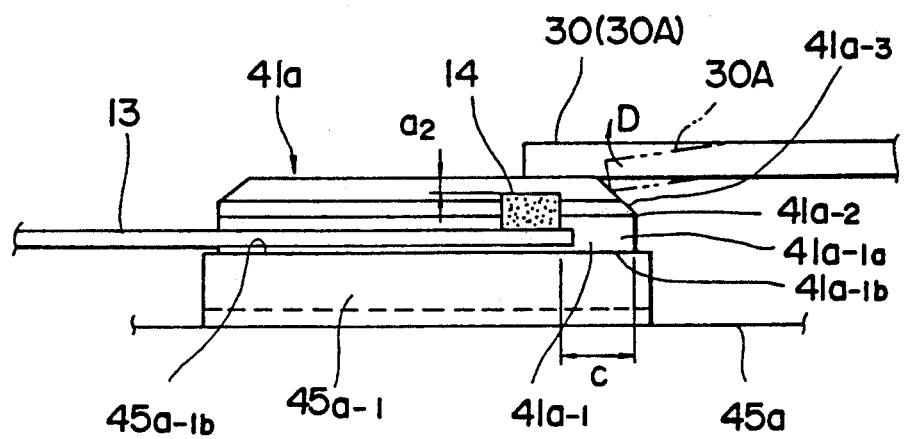
FIG. 9 is a sectional view along the section lines IX—IX of FIG. 4.

As shown in FIG. 9, in the status where the support portion 41a has reached the support position, to be described later, the end 41a-2 of the support portions 41a and on the side of the front fascia 12A is deflected by the dimension c from the magnetic head 14 and to the side of the front fascia 12A, and this portion becomes the inclined surface 41a-3. By doing this, a warped disk cartridge 30A that is inserted in the direction X1 is guided to the upwards direction as indicated by the arrow D in the diagram, before it can strike the magnetic head 14.

Figure 10:
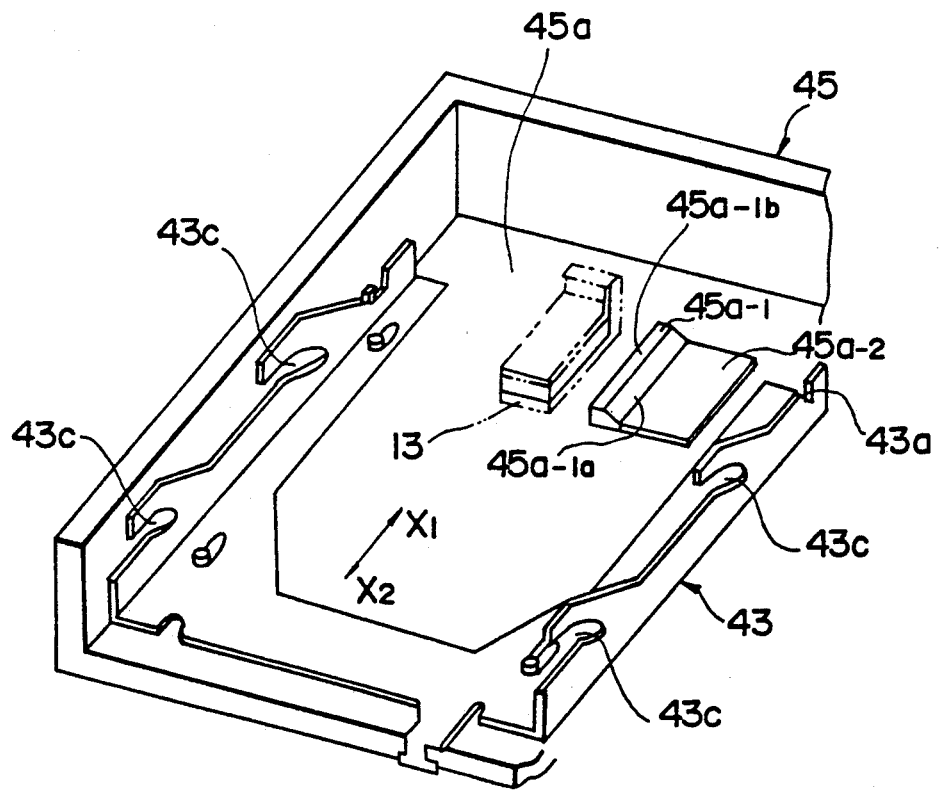
FIG. 10 is a perspective view with the cartridge holder and the disk cartridge of FIG. 4 removed.

In FIG. 10, 45 is a diecast apparatus main unit, and 45a is a chassis base.

The above described slide plate 43 for raising and lowering the disk cartridge, is provided so that it is in moving contact in the direction X1,X2 on the chassis base 45a.

In addition, pins 30e on both sides of the cartridge holder 30 of FIG. 5, are in engagement with the grooves 43c on the slide plate 43.

When the slide plate 43 is in moving contact in the direction indicated by the arrows X1.X2, then as has been described above, the operation of the L-shaped member 44 and the slide member 42a causes the disk cartridge support member 41 to move in the direction Y1-Y2.

45a-1 shown in FIG. 5 and FIG. 10 is a protruding portion, and element 45a-2 is a platform portion. The protruding portion 45a-1 and the platform portion 45a-2 are formed monolithically with the chassis base 45a. The dimension of this protruding portion 45a-1 in the direction of the length is, as shown in FIG. 9, approximately equal to the dimension of the support portion 41a in the direction of the length, and at that part is at a position opposing the protruding portion 41a (see FIG. 12) when the disk cartridge support member 41 is displaced in the direction of the arrow Y2. The side surface of the platform member 45a-2 and the protruding portion 45a-1 are inclined surfaces 45a-1a. In the status where the slide plate 43 is in moving contact with chassis base 45a in the direction X2, the L-shaped member 44 rotates in the clockwise direction as indicated in FIG. 4, and the slide member 42a moves in the Y1 direction and so the disk cartridge support member 41 is positioned at the position P10 shown in FIG. 6. The protruding portion 41a-1 is displaced in the direction Y1 with respect to the protruding portion 45a-1 and the disk cartridge support member 41 is displaced in the direction of the arrow A1, and the support portion 41a is positioned at the retreat position S1. This position S1 is positioned at a position lower by the dimension d from the lower surface of the disk cartridge 30. This position S1 is, as indicated in FIG. 8 and FIG. 10, positioned so that the support portion 41a approximately corresponds with the height of the head carriage 13, and is at a position so that the mounting of the disk cartridge 30 is not obstructed (it sinks in the direction of the central arrow Z1 in FIG. 7).

Also, the position S1 is so that the support portion 41a indicated in FIG. 5 is at approximately the same height as the flat top portion 45a-1b of the protruding portion 45a-1, and is compact in the retreat position where the support portion 41a does not operate.

Then, when the slide plate 43 is in moving in the direction X1, the L-shaped member 44 and the slide member 42a operate in the direction opposite to that described above, and the disk cartridge support member 41 moves in the direction Y2 so that the support member 41a comes to the position P20 shown in FIG. 5. When the disk cartridge support member 41 is moving, the inclined surface 41a-1a moves along the inclined surface 45a-1a and the protruding portion 41a-1 rises over the flat top portion 45a-1b of the protruding portion 45a-1.

By this, the support portion 41a rotates in the direction of the arrow A2 to resist the urging force of the arm member 41b, and the support portion 41a comes to the support position S2 that is the position where it protrudes from the head surface 14a of the lower side magnetic head 14 by the slight dimension a2 which is about 0.3 mm for example.

The disk cartridge support members 41 are regulated to a position on the rear side of the support portion 41a and so the position S2 is determined with good accuracy.

In addition, the protruding portion 45a-1 and the platform 45a-2 are both monolithic with the chassis base 45a and when compared to the configuration where the protruding portion 45a-1, the platform 45a-2 and the chassis base 45a are separate parts, the parts are more rigid, and hence the position S2 is determined more accurately.

As has been described above, the provision of the disk cartridge support member 41 enables the cartridge support surface 20d to be at a position higher than the head surface 14a of the lower side magnetic head 14 by a slight dimension of 0.3 mm for example, as indicated in FIG. 5 and FIG. 7, so that it is disposed at a position several millimeters higher than in a conventional apparatus.

In accordance with this, the height H2 of the cartridge insertion opening 21A of the front fascia 12A is also several millimeters lower by the dimension b2 and ultimately the magnetic disk apparatus 40 has a height dimension that is h2 which is several millimeters lower than that of a conventional apparatus, and the magnetic disk apparatus 40 can be made thinner than a conventional apparatus.

Then, the following is a description of the effect of moving the disk cartridge support member 41 in the direction vertical to the direction of insertion and removal of the disk cartridge 30 (the direction Y1–Y2) and of the support position described above, with reference to FIG. 12.

Figure 12:
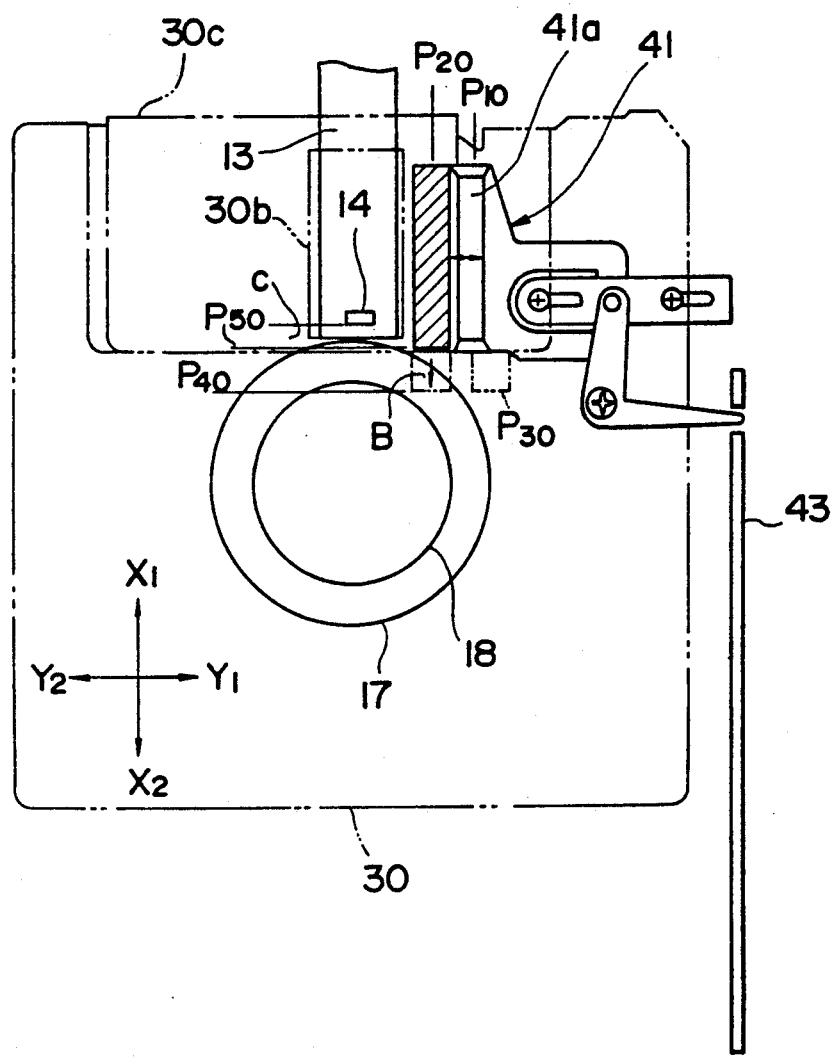
FIG. 12 is a view describing the effect of moving the disk cartridge support mechanism in the direction of insertion and removal of the disk cartridge and the vertical direction thereto.

FIG. 12 shows the status where the disk cartridge 30 is mounted, and when the shutter 30c of the disk cartridge 30 is in the open status, the magnetic head 14 enters the window opening 30b. In addition, the support portion 41a of the disk cartridge support member 41 is at the retreat position P10. The following will consider the case where the disk cartridge 30A is inserted and removed. When the disk cartridge 30A is inserted and removed, the support portion 41a described above moves to the position indicated by the position P20 (the position indicated by hatching in the figure).

The disk cartridge support member 41 is configured so that moving it in another direction X1–X2 causes the support portion 31a to move upwards. If the support portion 31 is moved in this direction, then the direction of movement becomes the same as that of the slide plate 43 and so there is the advantage that it is not necessary to provide a complex linkage mechanism. However, there is the following disadvantage with this method.

At the support position shown by the hatching in the figure, the position P50 of the end portion 41a-2 on the side of the X2 direction of the support portion 41a must be on the side of the X2 direction of the dimension c away from the magnetic head 14, as described in FIG. 9.

Accordingly, in this case, the retreat position of the support portion 41a becomes the position P40 that is further on the side of the X2 direction than the position P50. More specifically, the support portion 41a moves in the upwards direction by the movement from the position P40 to the position P50 indicated by the arrow B, and becomes the support position indicated by the hatching. However, this position P40 is in conflict with the position of the rotor portion of the spindle motor 17 shown in FIG. 7 and FIG. 12. Therefore, in the status where the dimension c described above is maintained, moving the support portion 41a in the direction X1–X2 to the support position means that the retreat position must be made the position P30 to avoid the spindle motor 17. However, the support position of the support portion 41a that is moved from this position P30 in the X1 direction becomes a position that is fairly remote from the magnetic head 14 in the X1 direction. In this case, there is nothing to support the disk cartridge 30 at the actual position where the magnetic head 14 are supported, and there is the high possibility that the magnetic head 14 and the disk cartridge 30 will strike each other.

In addition, the position P30 indicated in the same diagram is a position separated in the Y1 direction from the shutter 30c in the open status, and this portion is a portion where the shutter 30c slides and the disk cartridge 30 itself becomes thinner. Because of this, the disk cartridge 30 is moved downwards by the amount by which it becomes thinner, with respect to the support portion 41a, and this also involves the high possibility that the magnetic head 14 and the disk cartridge 30 will strike each other. Since there is a high possibility that the magnetic head 14 and the disk cartridge 30 will strike each other, the dimension a2 of the gap must be made larger, thereby reducing the amount by which the apparatus can be made thinner.

However, if as in the present embodiment, the disk cartridge support member 41 is moved to the support position by moving it in the direction Y1, then there is no influence to the position of the spindle motor 17, this support position is in the vicinity of the position of the magnetic head 14, and the direct support makes it possible to make the dimension a2 sufficiently small without there being any problems. In addition, the protruding portion 45a-1 is formed monolithically with the chassis base 45a and furthermore, the flat top portion 45a-1b of this protruding portion 45a-1 has the same action as the flat surface 41a-1b itself and so it is possible to improve the accuracy of the support position S2 and have little error, and no obstruction to the support portion 41a. Because of this, it is possible to make the magnetic disk apparatus 40 thinner by the amount for which the accuracy of the dimension a2 is improved. In addition, the protruding portion 45a-1 is formed monolithically with the chassis base 45a and there is a fewer number of parts and a stronger configuration when compared to a configuration with a separate member having the protruding portion corresponding to the protruding portion 45a-1.

The following is a description of the operation for mounting a warped disk cartridge with respect to the apparatus 40.

As shown in FIG. 7, the disk cartridge 30A is passed in the horizontal status through the insertion opening 21A, and is inserted in the direction indicated by the arrow X1 and furthermore, both sides are supported by the support grooves 20a, 20b of the cartridge holder 20 as the disk cartridge 30A is inserted. The disk cartridge support member 41 is positioned at the support position S2.

Because of this, before the leading edge 30a in the direction of insertion comes to the position of the magnetic head 14, the portion 30Aa-1 in approximately the center of the width of the cartridge 30A of the leading edge 30a in the direction of insertion reaches the end 41a-2 of the support portion 41a and is guided by the inclined surface 41a-3 to rise up over the support portion 41a. More specifically, the vicinity of a position opposing the magnetic head 14 and indicated by a solid line in FIG. 5 of the disk cartridge 30A is pushed up from the status where it is deformed as indicated by the double-dotted line, to a position slightly higher than the head surface 14a of the magnetic head 14.

By this, the disk cartridge 30A is definitely held in the small gap g between the magnetic head 14 and the head surface 14a and the passes along above the head surface 14a and over the magnetic head 14 without striking them to be inserted to the final position P1. When the disk cartridge 30A is inserted to its final position P1, the detector lever (not indicated in the figures) rotates and the lock of the slide plate 43 is released so that the slide plate 43 returns in the direction indicated by the arrow X2.

As has been described above, the return of the slide plate 43 moves the disk cartridge support member 41 in the direction Y1 and as shown in FIG. 5, and FIG. 6, the disk cartridge support member 41 first has its stopped status cancelled by the protruding portion 45a-1 and the urging of the arm portions 41b causes it to rotate in the direction of the arrow A1 and reach the retreat position S1.

Secondly, the cartridge holder 20 is lowered in the direction of the arrow Z1.

The disk cartridge 30A is lowered to a required position along with the apparatus 10 and without being obstructed by the disk cartridge support member 41, and is mounted as indicated in FIG. 6 and FIG. 8.

Recording and reproduction of information is performed in this status.

The following is a description of the operation for the removal of the disk cartridge 30A.

The eject button (not indicated in FIG. 8) is pressed.

By this, the slide plate 43 first moves in the direction indicated by the arrow X1, and the cartridge holder 20 in FIG. 8 rises in the direction indicated by the arrow Z2 and the bale arm 15 rotates in the upwards direction.

By this, the magnetic head 14,16 are separated from the magnetic disk 31 and away from the disk cartridge 30A.

Secondly, the disk cartridge support member 41 described above is moved in the direction Y2 and as indicated in FIG. 5, the support portion 41a rides up over the protruding portions 45a-1 and the urging force of the arm portions 41b is resisted to move in the direction of the arrow A2, so that the support portion 41a comes to the support position S2 shown in FIG. 5 and FIG. 9.

In this status, the disk cartridge 30A is pushed out in the direction of the arrow X2 and via the insertion opening 21A, to be ejected from the apparatus 40.

When the disk cartridge 30A is ejected, the lower surface of the inner portion of the disk cartridge 30A is supported by the support portion 41a as shown in FIG. 5, FIG. 7 and FIG. 9 so that it is securely held at a height that is definitely separated from the magnetic head 14, and the disk cartridge 30A is removed from a portion opposing the magnetic head 14 and without touching the head surface 14a of the magnetic head 14.

By this, it is possible to definitely prevent damage to the magnetic heads even when the cartridge is removed.

Even in the case when an unwarped cartridge 30 is mounted, the operation is the same as that described above for a warped cartridge and the lower surface is supported by the support portion 41a so that it is positioned at a position slightly higher than the head surface of the lower side magnetic head 14. By this, the disk cartridge 30 can mounted and dismounted without striking or scraping against the magnetic head 14.

In addition, a separate member having a protruding portion corresponding to the protruding portion 45a-1 can be provided so that this member moves on the chassis base 45a to act upon the rear side of the support portion 41a of the disk cartridge support member 41 so as to press it upwards.

Moreover, the disk cartridge support member can be provided on both the left and right surface sides when seen from the direction of insertion of the cartridge.

The following is a description of a second embodiment according to the present invention.

Figure 14:
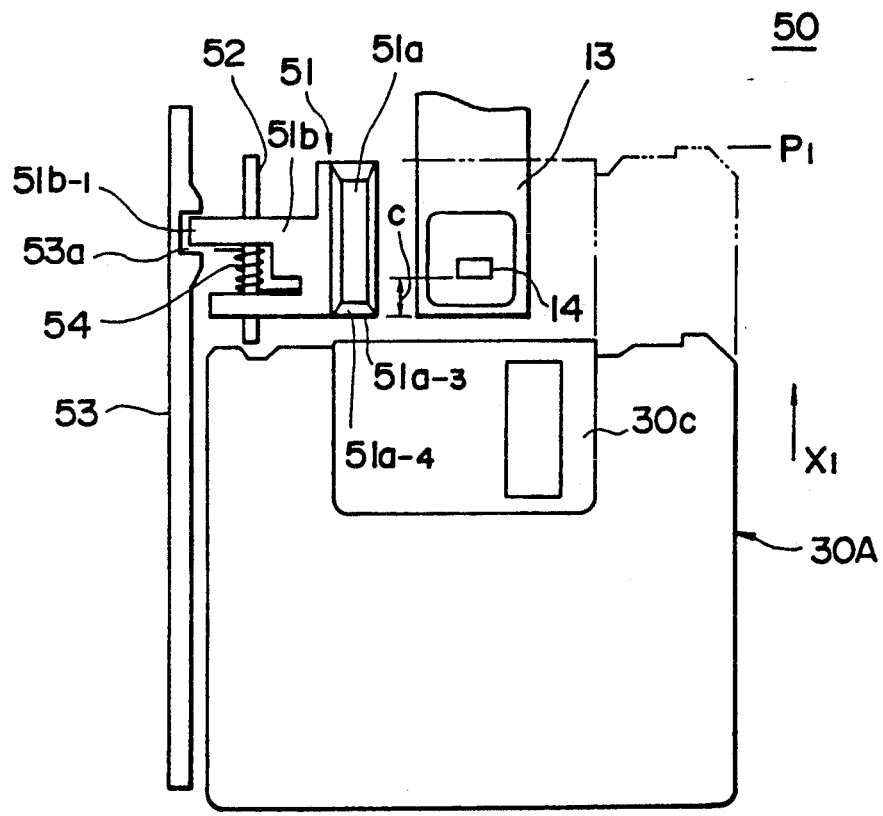
FIG. 14 is a plan view showing a magnetic disk apparatus of a second embodiment according to the present invention.
Figure 16:
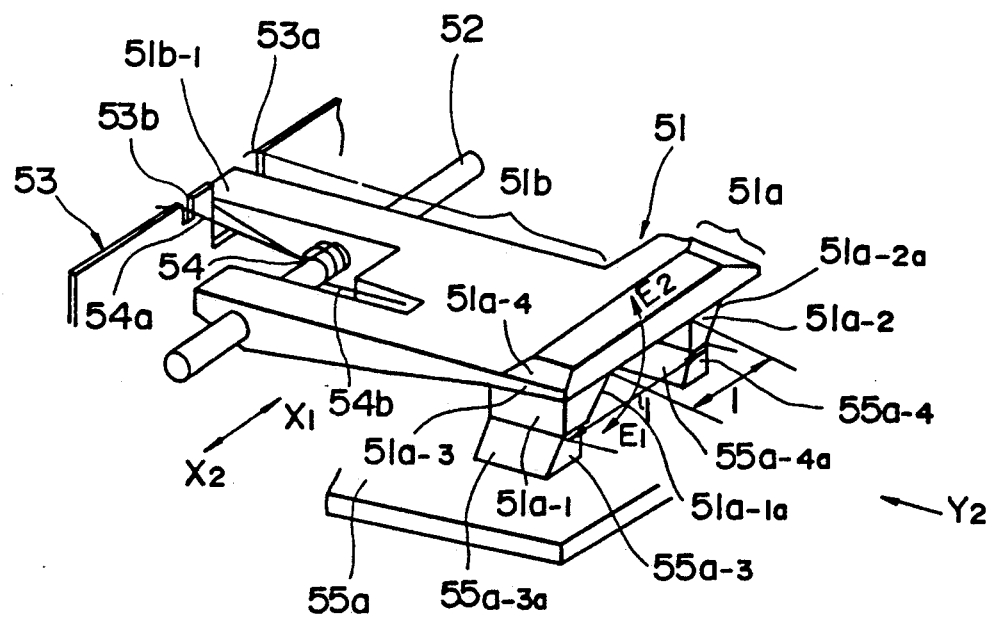
FIG. 16 is a perspective view of the major portions of FIG. 14.

FIG. 14 shows a magnetic disk apparatus 50 of a second embodiment according to the present invention. Element 51 is a disk cartridge support member and as shown in FIG. 16, comprises a disk cartridge support portion 51a and an arm member 51b that extends to one side. This disk cartridge support member 51 is provided so that the arm member 51b is supported by a shaft 52 that extends in the direction of insertion of the cartridge and the disk cartridge support portion 51a rotates in the surface perpendicular to the direction of insertion of the cartridge, as shown by the arrows E1,E2.

In addition, the disk cartridge support member 51 is in moving contact along the shaft 52 in the direction of the arrows X1,X2.

Furthermore, the rear surface of the disk cartridge support portion 51a has formed in it a pair of protruding portions 51a-1,51a-2.

These protruding portions 51a-1,51a-2 are provided so as to be separated by an interval 1 and so as to be arranged in the directions indicated by the arrows X1,X2.

In addition, of these protruding portions 51a-1,51a-2 have their inclined surfaces 51a-1a,51a-1b on the inner side of the apparatus 50, that is, the sides in the direction of the arrow X1.

Also, the lower ends which are the distal ends of these protruding portions 51a-1,51a-2 are the flat surfaces 51a-1b,51a-2b.

The disk cartridge support portion 51a is at a position to the left side of the lower side magnetic head 14, when seen from the direction of insertion of the cartridge, and is disposed so that at a position in the vicinity of the lower side magnetic head 14, it extends in the direction of insertion of the cartridge. In addition, in the status where the disk cartridge support member 51 is at a support position to be described later, the end 51a-3 of the disk cartridge support portion 51a on the front fascia surface is deflected by a dimension c away from the magnetic head 14 and towards the side of the front fascia surface (refer to FIG. 14) and this portion becomes the inclined surface 51a-4.

The distal end side 51b-1 of the arm member 51b engages with the cutout 53a of the slide plate 53 for raising and lowering the disk cartridge.

Element 54 is a torsion coil spring, and engages with the shaft 52 and one of the arm portions 54a engages with the cutout 53b of the slide plate 53 and is provided so as to engage and stop the other arm portion 54b to the arm portion 51b, so that the disk cartridge support member 51 is urged in the direction of the arrow E1.

Figure 11:
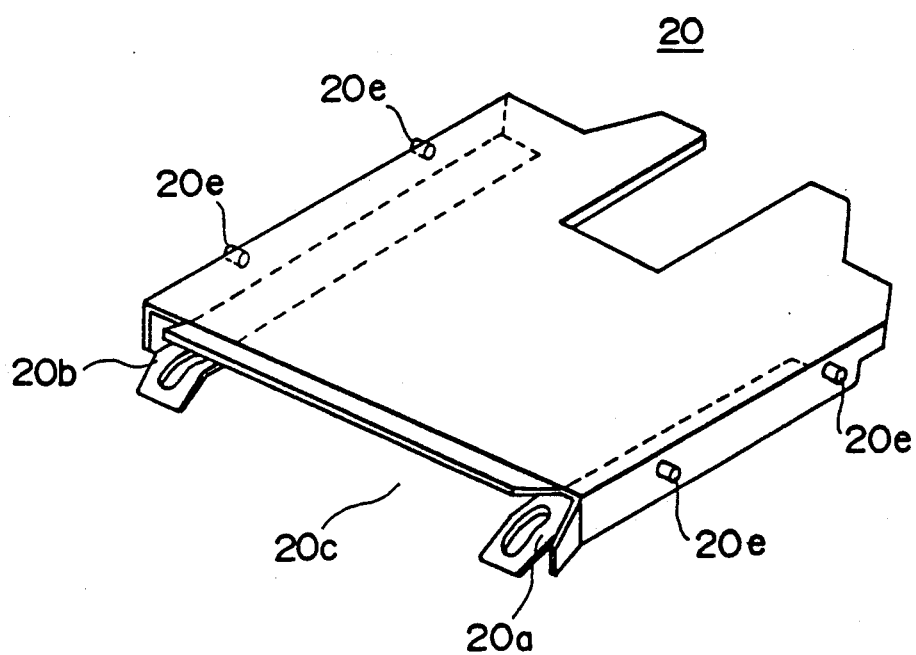
FIG. 11 is a perspective view of the cartridge holder.
Figure 15:
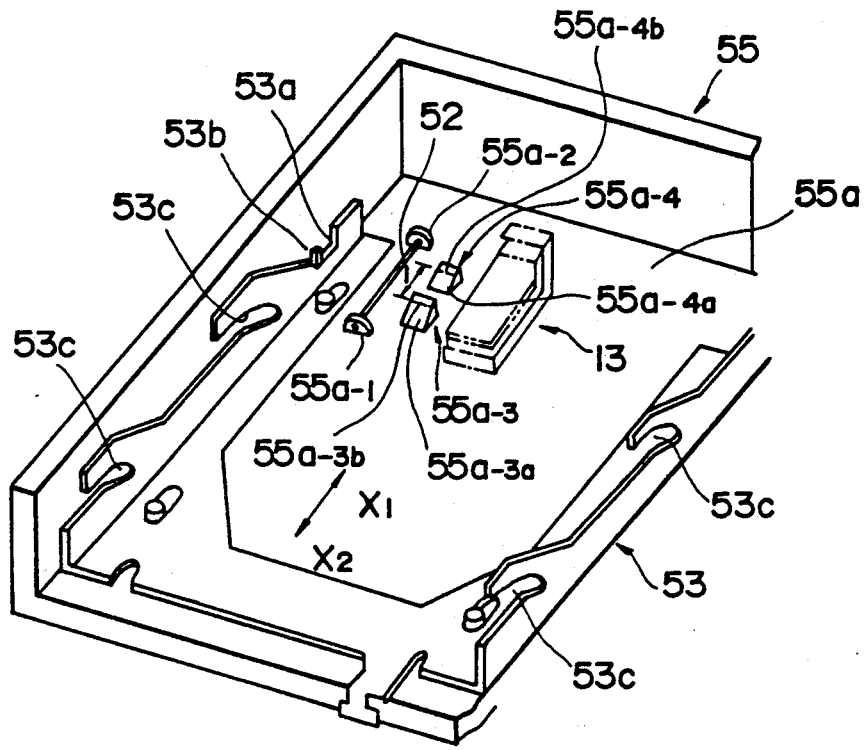
FIG. 15 is a perspective view with the cartridge holder and the disk cartridge of FIG. 14 removed.

In FIG. 15, element 55 is a diecast apparatus main unit, and 55a is the chassis base of that main unit. The shaft 52 described above is formed monolithically with the chassis base 55a, and flanges 55a-1,55a-2 are fixed to both ends and fixed on the chassis base 55a. The slide plate 53 for raising and lowering the disk cartridge is provided so as to be in moving contact on the chassis base 55a, in the direction of the arrow X2. In addition, inside the groove 53c of the slide plate 53 engages pins 20e on both sides of the cartridge holder 20 of FIG. 11.

When the slide plate 53 moves in the direction of the arrows X1,X2, the support member 51 described above is monolithic with the slide plate 53 and is supported by and moves along the shaft 52 in the directions of the arrows X1,X2.

Elements 55a-3,55a-4 are protruding portions and as shown in FIG. 15, FIG. 16, FIG. 17 and FIG. 18 are formed monolithically with the chassis base 55a.

The gap between these protruding portions 55a-3,55a-4 is the same as the gap 1 between the protruding portions 51a-1,55a-2 described above and their position is the position opposing the protruding portions 51a-1,51a-2 when position of the support member 51 changes in the direction of the arrow X2.

The protruding portions 55a-3,55a-4 have inclined surfaces 55a-3a,55a-4a.

The protruding portions 51a-1,51a-2 are displaced in the direction X2 with respect to the protruding portions 55a-3,55a-4 and the support member 51 is displaced in the direction of the arrow E1 and the support member 51a is positioned at the retreat position S1.

Figures 17, 18:
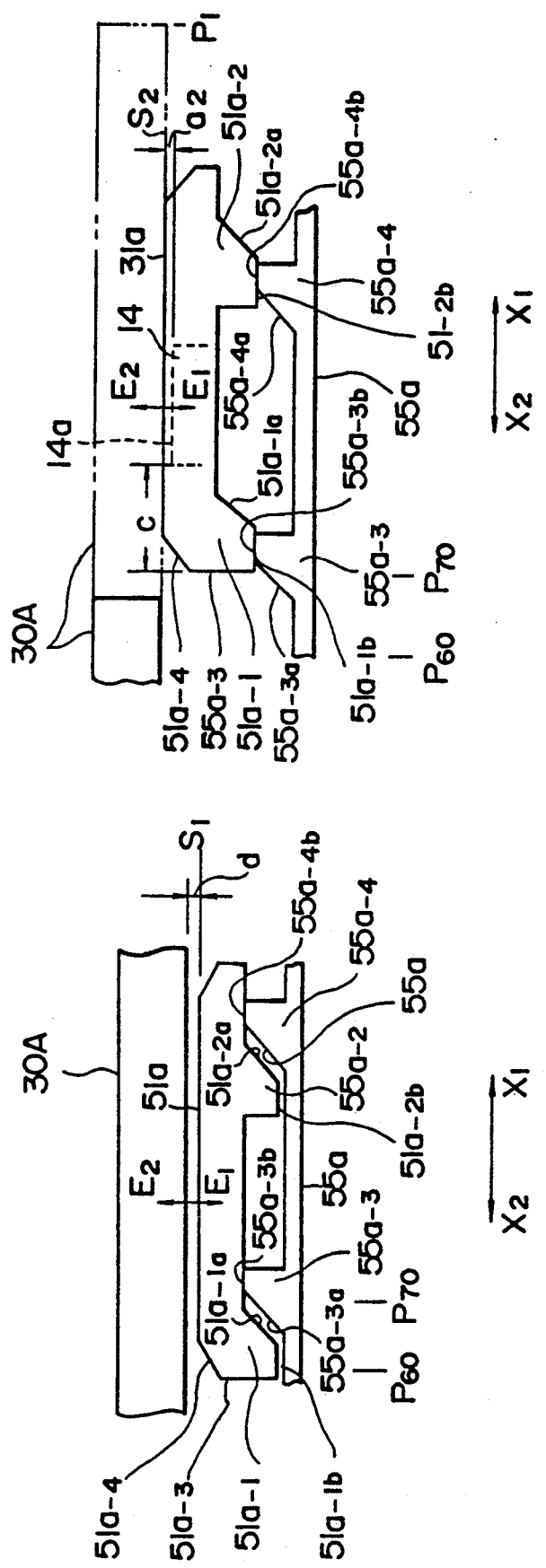
FIG. 17 is a view from the direction of the arrow Y2 of FIG. 16, showing the status where the disk cartridge support member is supported at the retreated position.
FIG. 18 is a view from the direction of the arrow Y2 of FIG. 16.

When the slide plate 53 is in moving contact in the direction of the arrow X1, the support member 51 also moves in the same direction to come to the position P70 indicated in FIG. 18.

When the support member 51 moves, the inclined surfaces 51a-1a,51a-2a move along the inclined surfaces 55a-3a,55a-4a and the the inclined surfaces 51a-1a,51a-2a ride up over the top portions 55a-3b,55a-4b of the protruding portions 55a-3,55a-4.

By this, the support portion 51 resists the action of spring 54 and rotates in the direction of the arrow E2, and the support portion 51a has its rear side regulated and comes to the support position S2 (refer to FIG. 18).

The following is a description of the operation for the inserting of a warped disk cartridge 30A to the apparatus 50.

A support member 51 is positioned at the support position S1.

Because of this, it rides up over the support portion 51a and passes slightly above the head surface 14a of the magnetic head 14.

When the cartridge 30A is inserted up to the final position P1, the detection lever (not indicated in the figure) rotates and the lock of the slide plate 53 is cancelled, and the slide plate 53 returns in the direction of the arrow X2.

This returning of the slide plate 53 first causes the support member 51 to have its stop cancelled by the protruding portions 55a-3,55a-4 so as to rotate in the direction of the arrow E1 by the spring 54 and come to the retreat position S1.

Secondly, the cartridge holder 20 is lowered in the direction of the arrow Z1.

The disk cartridge 30A is then lowered and mounted without being obstructed by the support member 51.

The following is a description of the operation for the removal of the disk cartridge 30A.

The eject button (not indicated in the figure) is pressed.

By this, the slide plate 53 first moves in the direction of the arrow X1 and the cartridge holder 20 rises in the direction of the arrow Z2 and the bale arm 15 rotates in the upwards direction.

By this, the magnetic heads 14,16 are separated from the magnetic disk 31 and taken out of the disk cartridge 30A.

Secondly, the support member 51 rides up over the protruding portions 55a-3,55a-4, resists the spring 54 and rotates in the direction of the arrow E2 to come to the support position S1.

In this status, the cartridge 30A passes through the insertion opening 21A and is pushed out in the direction of the arrow X2 to be removed from the apparatus 50.

When the cartridge 30A is pressed out, the lower surface on the inside portion of the cartridge 30A is supported by the support portion 51a and can be removed from a position opposing the magnetic head without rubbing the head surface 14a of the magnetic head 14.

In addition, a separate member having a protruding portion corresponding to the protruding portion 55a-3,55a-4 can be provided so that this member moves to act upon the rear side of the support portion 51a of the disk cartridge support member 51 so as to press it upwards.

Moreover, the disk cartridge support member can be provided on both the left and right surface sides when seen from the direction of insertion of the cartridge.

The following is a description of a third embodiment according to the present invention. FIG. 19 through FIG. 22 show a magnetic disk apparatus 60 according to a third embodiment of the present invention. In the figure, those portions that correspond to portions of the configuration indicated in FIG. 1 through FIG. 3 are indicated with corresponding numerals, and the corresponding descriptions of them are omitted.

Figure 19:
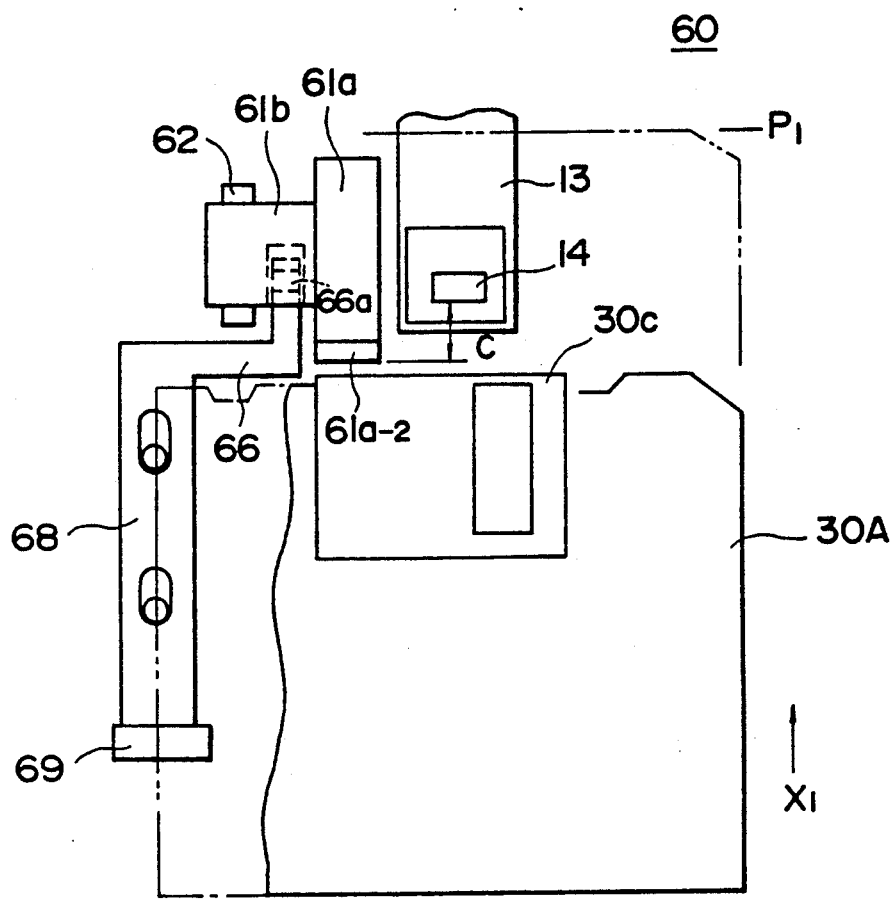
FIG. 19 is a view indicating the status prior to the inserting of the disk cartridge of the magnetic disk apparatus of a third embodiment according to the present invention.
Figure 20:
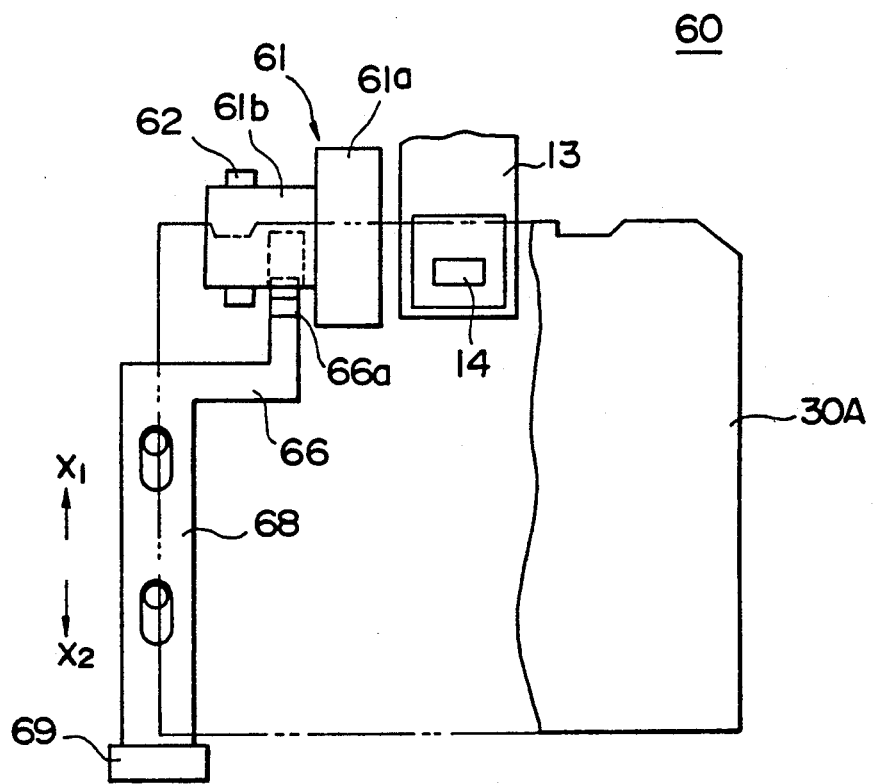
FIG. 20 is a view indicating the status where the disk cartridge is inserted.

FIG. 19 shows the status prior to the mounting of the cartridge, and FIG. 20 shows the status when the cartridge has been mounted.

Figure 21:
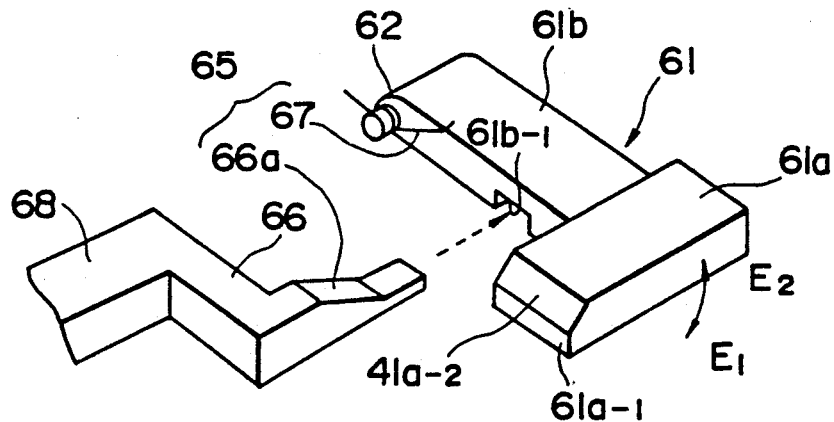
FIG. 21 is a view indicating the disk cartridge mechanism and the mechanism that displaces it.

Element 61 is a disk cartridge support member and as shown in FIG. 21, comprises the disk cartridge support portion 61a and the arm portion 61b that extends to one side of it.

The disk cartridge support member 61 is provided so that the distal end portion of the arm portion 61b is supported by the fixed shaft 62 that extends in the direction of insertion of the cartridge, and the support portion 61a rotates in a surface perpendicular to the direction of insertion of the cartridge, as indicated by the arrows E1,E2.

The support portion 61a is disposed to the left side of the lower side magnetic head 14 when seen from the direction of insertion of the cartridge, and is disposed in a position in the vicinity of the magnetic head 14 and extends in the direction of insertion of the cartridge.

In addition, the end 61a-1 of the fascia side of the support portion 61a is displaced by the dimension c away from the magnetic head 14 and in the direction of the front fascia surface (refer to FIG. 19) and this portion is an inclined surface 61a-2.

In FIG. 21, element 65 is a disk cartridge support portion displacement mechanism and comprises a cam 66a of an arm portion 66, and a spring 67 and the like provided to a shaft 62.

The spring 67 urges the support member 61 in the direction of the arrow E1.

The arm portion 66 is provided to the distal end of the cartridge eject lever 68.

Figure 22:
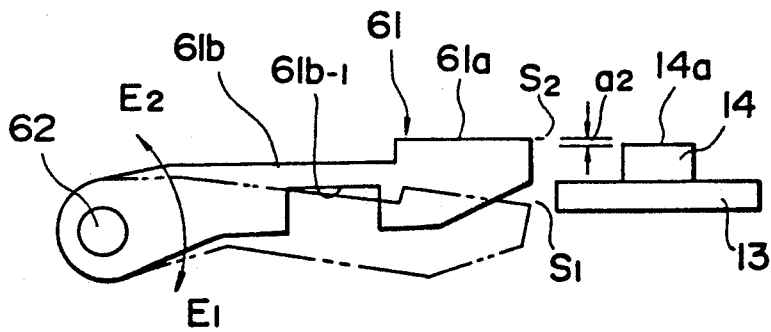
FIG. 22 is a view describing the displacement of the disk cartridge support member.

In the status where the cartridge eject button 69 shown in FIG. 19 is pressed, the lever 68 is displaced in the direction of the arrow X1, the cam portion 66a of the arm portion 66 enters inside the groove 61b-1, and the support member 61 resists the spring 67 and is pushed up to be rotated in the direction indicated by the arrow E2 to be positioned at the disk cartridge support position S2 shown in FIG. 22. In the status where the disk cartridge eject button 69 is returned, as shown in FIG. 20, the lever 68 is displaced in the direction of the arrow X2 and the cam 66a of the arm portion 66 is taken out from the groove 61b-1 of the arm portion 61b, and the support member 61 is rotated in the direction of the arrow E1 by the spring 67 and arrives at the retreat position S1.

When a warped disk cartridge 30A is inserted, the support member 61 is positioned at the support position S2.

The disk cartridge 30A rises over the support portion 61a so that it rises slightly over the head surface 14a of the magnetic head 14 and is inserted to the final position P1.

When the disk cartridge 30A is inserted to the final position P1, the eject lever 68 returns to in the direction shown by the arrow X2. The support member 61 cancels the stop by the cam 66a and is rotated in the direction indicated by the arrow E1 by the spring 62 to come to the retreat position S1.

In FIG. 20, pressing the eject button 69 in the direction of the arrow X1 ejects the cartridge 30A. When the eject button 69 is pressed, the support member 61 comes to the support position S2.

The cartridge 30A is supported by the support portion 61a and is separated from the head surface 14a without rubbing against it.

In addition, conversely to the above, it is also possible to provide a cam to the side of the disk cartridge support member 61 instead of providing it to the arm portion 66.

Moreover, the present invention is not limited to magnetic disk apparatus, but can be also applied to optical disk apparatus. In this case, the cartridge support members is provided in the vicinity of the optical head.

What is claimed is:

1. A magnetic disk drive apparatus for recording and/or reproducing information on and from a flexible magnetic disk accommodated in a cartridge, said cartridge having a major surface parallel to a major surface of the magnetic disk on which the recording/reproducing occurs, said apparatus comprising:

a chassis;

magnetic head means for recording and/or reproducing information on and from said flexible magnetic disk;

head carriage means provided on said chassis for carrying said magnetic head means thereon, said head carriage means moving said magnetic head means along said flexible magnetic disk;

disk carriage means provided on said chassis for holding said cartridge therein, said disk carriage means being movable between a first condition and a second, different condition, said first condition being one in which said magnetic head means records and/or reproduces information on and from said magnetic disk, said second condition being one in which loading and an unloading of said cartridge on and from said disk carriage means can be carried out;

head protection means provided on said chassis for movement between a first position and a second position offset from said first position, said head protection means assuming said first position when said disk carriage means is in said first condition for disengaging said head protection means from said cartridge, said head protection means assuming said second position when said disk carriage means is in said second condition for engaging said head protection means with said major surface of said cartridge for biasing said cartridge such that an engagement between said magnetic head means and said cartridge is prohibited; and actuation means for actuating said head protection means such that said head protection means is in said first position when said disk cartridge means is in said first condition and such that said head protection means is in said second position when said disk carriage means is in said second condition.

2. A magnetic disk drive apparatus as claimed in claim 1 in which said head protection means comprises a lever member that engages with said major surface of said cartridge for urging said cartridge away from said magnetic head means, and wherein said actuation means comprises a cam surface provided on said chassis for urging said lever member away from said cartridge in a direction substantially perpendicular to said major surface.

3. A magnetic disk drive apparatus as claimed in claim 2 in which said actuation means comprises an actuation rod adapted for actuation from an exterior of said disk drive apparatus, said actuation rod being movable between a first position and a second, different position, and a link mechanism for connecting said actuation rod and said lever member with each other such that a movement of said actuation rod between said first and second positions causes a movement of said lever member along said cam surface.

4. A magnetic disk apparatus as claimed in claim 2 in which said lever member has a guide surface for engagement with said major surface of said cartridge, when said cartridge is loaded on said disk cartridge means with said head protection means in said second position so that said major surface is displaced away from said magnetic head means.

* * * * *